April 7, 1936.  C. GOMES  2,036,933
NONBOILING AUTOMATIC COFFEE MAKER
Filed Feb. 4, 1935   2 Sheets-Sheet 1
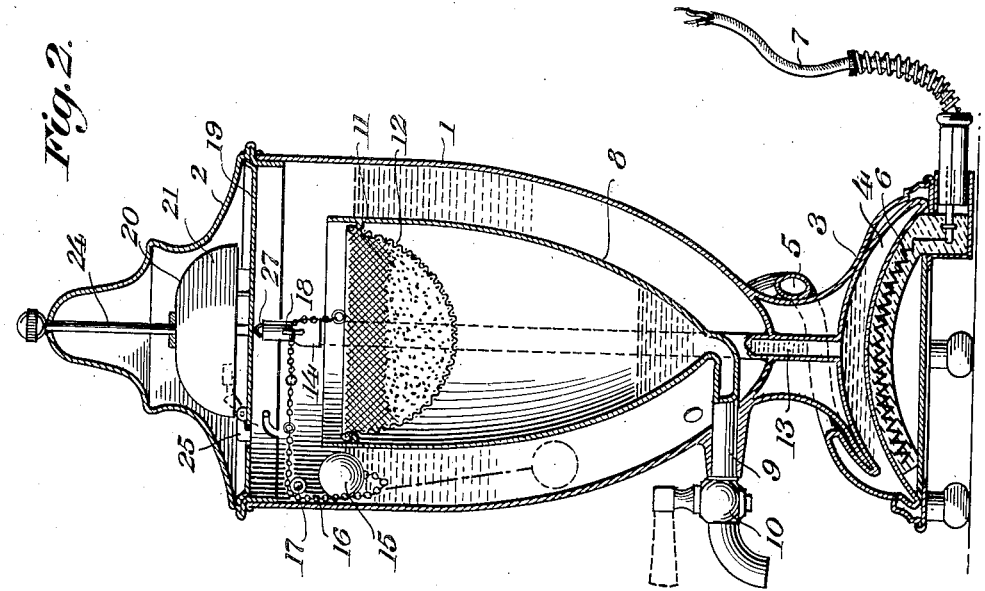
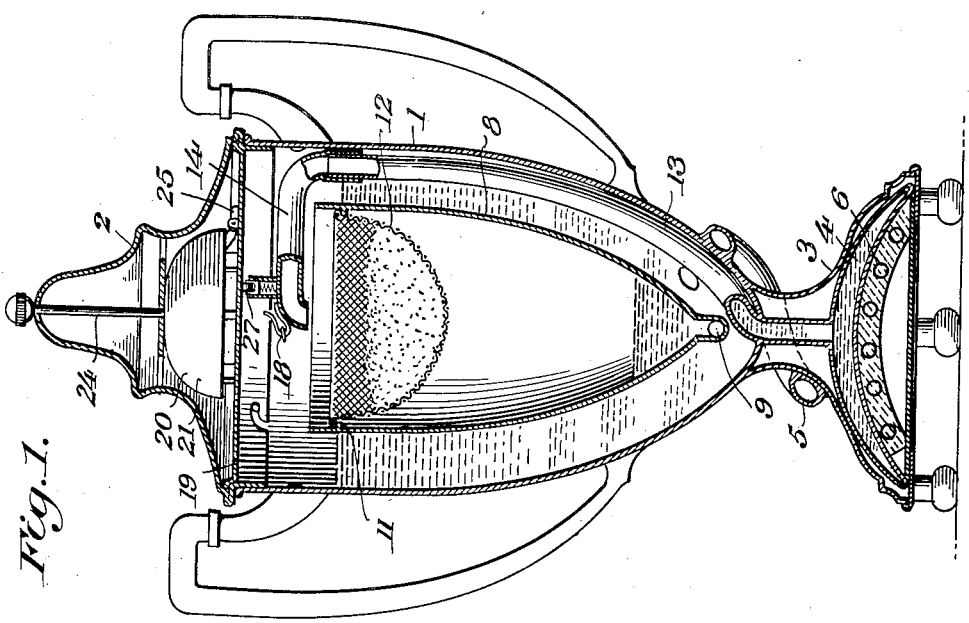
Clodoveu Gomes
INVENTOR
BY *Victor J. Evans & Co.*
ATTORNEYS April 7, 1936.                    C. GOMES                        2,036,933
                    NONBOILING AUTOMATIC COFFEE MAKER
                         Filed Feb. 4, 1935              2 Sheets-Sheet 2
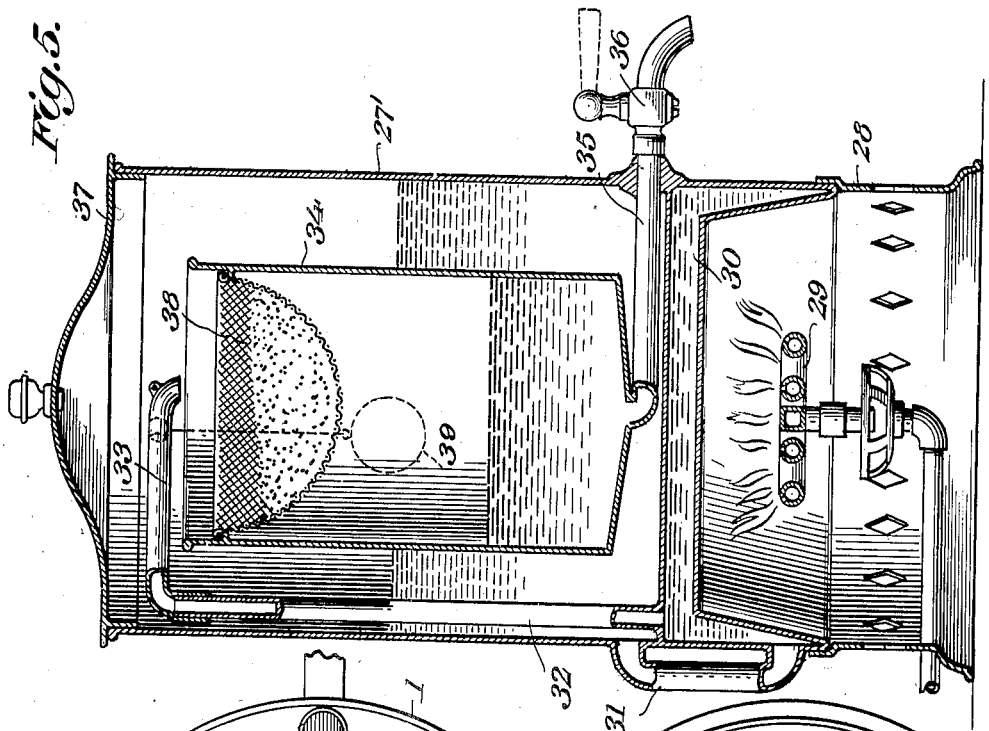
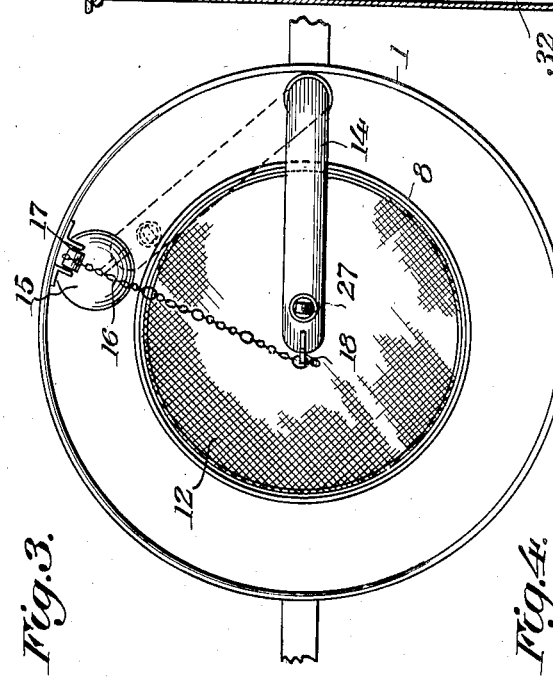
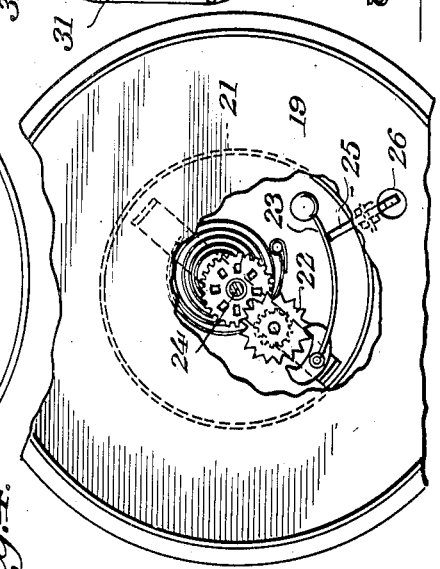
Clodoveu Gomes
                INVENTOR
BY Victor J. Evans & Co.
                ATTORNEYS Patented Apr. 7, 1936

2,036,933

UNITED STATES PATENT OFFICE 2,036,933

NONBOILING AUTOMATIC COFFEE MAKER

Clodoveu Gomes, New Orleans, La.

Application February 4, 1935, Serial No. 4,970

3 Claims. (Cl. 53—3)

This invention relates to a coffee maker and has for the primary object the provision of a device of this character which will brew a predetermined amount of coffee beverage without the liability of boiling the beverage and which will maintain the beverage hot or slightly below boiling temperature so as to be in condition for drinking.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a vertical sectional view illustrating a coffee maker constructed in accordance with my invention.

Figure 2 is a similar view taken at right angles to Figure 1.

Figure 3 is a top plan view with the cover removed.

Figure 4 is a bottom plan view showing the alarm mechanism.

Figure 5 is a vertical sectional view illustrating a modified form of my invention.

Referring in detail to the drawings, the numeral 1 indicates an outer container equipped with a removable cover 2 and a pedestal 3 in which is formed a boiler 4, the latter having communication with the interior of the container 1 by a tube 5 arranged in any desired artistic manner upon the exterior of the pedestal or, if desired, the tube 5 may extend from the boiler upwardly through the pedestal for communication with the interior of the container 1. Mounted in the pedestal 3 is an electrical heating element 6, the extension cord 7 of which may be readily connected to an electrical output.

An inner container 8 is arranged within the outer container and of a less height than the outer container and is equipped with an outlet pipe 9 extended through the outer container and provided with a control valve 10 preferably in the form of a pouring spout. The pipe 9 joins with the lower end of the inner container and forms a support for the latter. An internal flange 11 is located in the inner container below the upper edge thereof for the purpose of removably supporting a foraminous receptacle 12 in which coffee is placed.

The boiler 4 has an outlet pipe 13 which extends upwardly in the outer container 1 and has rotatably connected thereto a horizontally arranged discharge pipe 14 capable of being positioned to overlie either the receptacle 12 or to dispense water back into the outer container.

Operating in the container 1 is a float 15 connected to a flexible element or chain 16 trained over a pulley 17 carried by the outer container. The chain is provided with spaced marked links any one of which may be engaged with a hook or like fastener 18 on the discharge pipe 14. By engaging the different marked links with the hook 18, the amount of coffee beverage to be brewed by the device may be varied.

In operation, the outer container after the placing of the coffee in the receptacle 12, is partially filled with water, that is, the height of the water is slightly below the upper edge of the inner container. The discharge pipe 14 is positioned over the receptacle 12 with the hook 18 placed in the selected marked link for the amount of coffee beverage to be brewed. The water is boiled in the boiler 4 by the heating unit 6 and the boiling water rises upwardly through the pipe 13 and through the discharge pipe 14 into the receptacle 12. As the water recedes in the outer receptacle, the float drops or gravitates and the float acts to draw or swing the discharge pipe 14 laterally from over the receptacle 12 so that the boiling water discharging therefrom may then discharge back into the outer container. The water passing through the coffee becomes impregnated with the coffee essence and forms a desired coffee brew in the inner receptacle 8 which may be dispensed therefrom by way of the nozzle of the control valve 10. Thus it will be seen that the coffee beverage may be brewed without the liability of boiling and further, that the beverage may be kept hot or just below a boiling temperature within the inner receptacle 8 without a chance of it boiling and becoming bitter or spoiled thereby.

The cover 2 is of hollow formation and is closed by a wall 19 which supports in the cover an alarm 20 consisting of a bell 21, a spring actuated escapement 22 for effecting operation of a gong 23 adapted to strike the bell 21. The spring may be wound by a stem 24 extending exteriorly of the cover. The gong is kept from actuating by a pivotally mounted catch 25 carried by the cover, one end of which enters an opening 26 in the wall 19. A spring-pressed element 27 is carried by the discharge pipe 14 and rides against the wall 19 and when the pipe 14 is moved laterally of the inner container by the float, the element 27 engages the catch 25 to free the latter from the gong so that the latter may strike the bell to give an alarm for the purpose of indicating that the device has finished making the desired amount of coffee beverage.

Referring to my modified form of invention as shown in Figure 5, the device is similarly constructed to the form shown in Figures 1 and 2 except arranged for use in restaurants, hotels and like places and consists of an outer container 27' mounted on a pedestal 28 in which a burner 29 is located. Formed in the lower portion of the outer container is a boiler 30 communicative with the interior of the outer container by a pipe 31. An outlet pipe 32 connects with the boiler and extends upwardly in the container 27' and has rotatably secured thereto a horizontally arranged discharge pipe 33. An inner container 34 is located within the outer container and its outlet pipe 35 extends through the outer container and is provided with a dispensing valve 36. The outer container is closed by a removable cover 37 and the inner container 34 has removably mounted therein a foraminous receptacle 38 in which the coffee is placed. The discharge pipe 33 has connected thereto a float 39 through a chain or similar flexible element. The operation of the device just described is the same as the operation described in connection with the type of device shown in Figures 1 and 2.

Having described the invention, I claim:

1. A coffee maker comprising a pedestal, an outer container supported by said pedestal and adapted to contain water, an inner container arranged within the outer container in which coffee beverage may be brewed, means for dispensing coffee beverage from the inner container, a boiler carried by said pedestal, means for connecting the boiler to the outer container to receive water therefrom, a movable means connected to the boiler for dispensing boiling water either into the outer container or the inner container, means for supporting coffee in the inner container, a float operating in the water of the outer container, a flexible element connected to said float and having marked spaced links, any one of which is adapted to be detachably secured to said movable means for varying the amount of coffee beverage to be made in the inner container, said float adapted to position said movable means for dispensing boiling water to the outer container after a predetermined amount of water has been dispensed to the inner container.

2. A coffee maker comprising a pedestal, an outer container supported by said pedestal and adapted to contain water, an inner container arranged within the outer container in which coffee beverage may be brewed, means for dispensing coffee beverage from the inner container, a boiler carried by said pedestal, means for connecting the boiler to the outer container to receive water therefrom, a movable means connected to the boiler for dispensing boiling water either into the outer container or the inner container, means for supporting coffee in the inner container, a float operating in the water of the outer container, a flexible element connected to said float and having marked spaced links, any one of which is adapted to be detachably secured to said movable means for varying the amount of coffee beverage to be made in the inner container, said float adapted to position said movable means for dispensing boiling water to the outer container after a predetermined amount of water has been dispensed to the inner container, an alarm mechanism actuated by the movable means moving into position to dispense boiling water to the outer container.

3. A coffee maker comprising inner and outer containers and said outer container adapted to contain water, removable means for supporting coffee in the inner container, a boiler connected to the outer container to receive water therefrom, means for heating said boiler, means for dispensing coffee beverage from the inner container, a pipe connected to the boiler and extending upwardly into the outer container, a dispensing pipe journaled to the first-named pipe for dispensing boiling water either to the inner container or the outer container, and a float mechanism adjustably connected to the dispensing pipe for automatically positioning said dispensing pipe to dispense water to the outer container when a predetermined amount of water has been dispensed to the inner container.

CLODOVEU GOMES.